W. MITCHELL.
MANUFACTURE OF ARTIFICIAL STONE.

No. 176,666. Patented April 25, 1876.

Witnesses.
A. Ruppert.
John Eils

W. Mitchell
Inventor.
by C. C. J. Eils
Atty

UNITED STATES PATENT OFFICE.

WILSON MITCHELL, OF PHILADELPHIA, PENNSYLVANIA.

IMPROVEMENT IN THE MANUFACTURE OF ARTIFICIAL STONE.

Specification forming part of Letters Patent No. 176,666, dated April 25, 1876; application filed April 1, 1876.

*To all whom it may concern:*

Be it known that I, WILSON MITCHELL, of Philadelphia, in the county of Philadelphia and State of Pennsylvania, have invented a new and useful Improvement in the Art of Manufacturing Artificial Stone, of which the following is a specification:

This invention relates to the manufacture of artificial stone for building, paving, and other like purposes. The object it seeks to attain is the production of a stone which, by reason of its superior density and hardness, will be capable of longer resistance to deleterious atmospheric influences, as well as to constant attrition, and will consequently be better adapted to the purposes alluded to than any other artificial stone now in the market.

The usual process in the manufacture of artificial stone is to tamp the loose damp material, ordinarily consisting of a mixture of Portland or other hydraulic cement and clean sharp sand into a mold, by hand-power, to the greatest density and hardness attainable in that way, after which it is immersed in water for hardening. A stone produced in this manner is found to be deficient in hardness and durability. This defect is remedied by my improvement, which consists in compressing the loose damp material into the mold by means of a heated plunger attached to a screw or hydraulic press which is driven by steam-power, and capable of exerting a gradual pressure of four hundred tons and upward.

Figure 1:
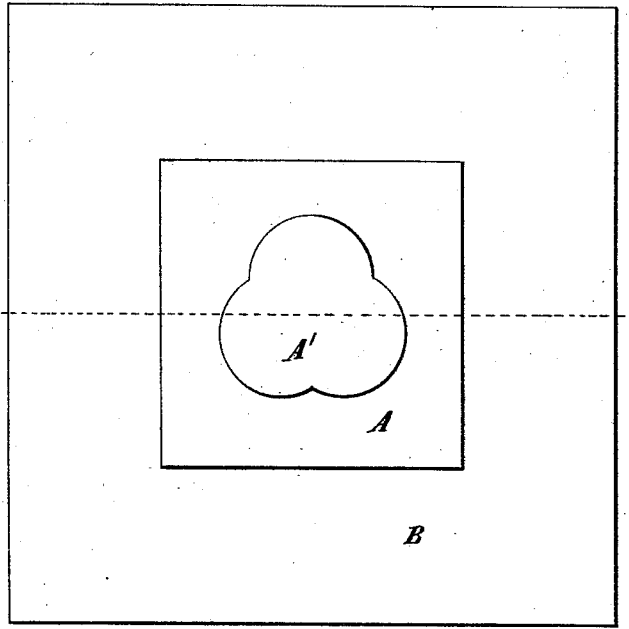
Figure 2:
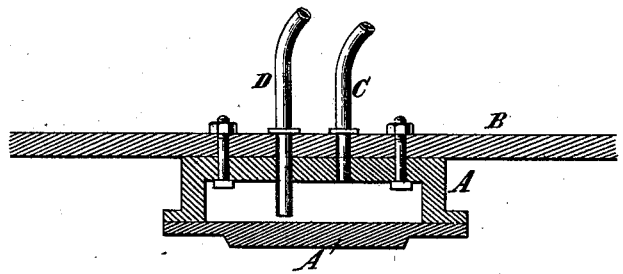

In the annexed drawing, Figure 1 is a bottom view of the plunger. Fig. 2 is a vertical section on line X X, Fig. 1.

Similar letters of reference indicate corresponding parts.

The hollow plunger A is bolted, or in some other suitable manner secured, to the movable platen B of a screw or hydraulic press. The interior of the plunger is supplied with steam through the pipe C, which connects said plunger with a steam-boiler. D is an exhaust-pipe, which, reaching nearly down to the bottom of the plunger, will not only exhaust the steam, but also the water formed by condensation.

The design A', which is formed on the face of the plunger when any ornamental inlaid tile or stone is to be produced, will be omitted in the manufacture of plain stones or tiles.

The operation is as follows: A heavy iron mold, having the size and shape of the stone or tile to be produced, is filled with a mixture of loose damp hydraulic cement and clean sharp sand. The press, which should be capable of exerting a pressure of four hundred tons and upward, is then set in motion, when the plunger, which fits snugly in the mold, will slowly descend and gradually compress the material into the required compactness. The face of the plunger is smoothly dressed, and, being kept sufficiently warm by the steam in its interior to slightly dry the upper surface of the stone or tile, it can be freely withdrawn without marring such surface. On its removal from the mold the stone is, as usual, immersed in or besprinkled with water for hardening.

In manufacturing ornamental tiles the depression made by the design in the face of the tile may subsequently be filled up with material of another color. Highly ornamental inlaid tiles for vestibules, &c., may thus be produced very cheaply.

What I claim as my invention, and desire to secure by Letters Patent, is—

As an improvement in the art of manufacturing artificial stone, the method of solidifying the material in a mold with a heated plunger, substantially as and for the purpose specified.

In testimony whereof I have signed my name to the foregoing specification in the presence of two subscribing witnesses.

WILSON MITCHELL.

Witnesses:
JOHN H. CAHILL,
JOHN FROMBERGER.